March 21, 1933.  C. R. DUNHAM ET AL  1,901,951
MULTIPLEX TELEGRAPH DISTRIBUTOR
Filed Oct. 31, 1931  3 Sheets-Sheet 2

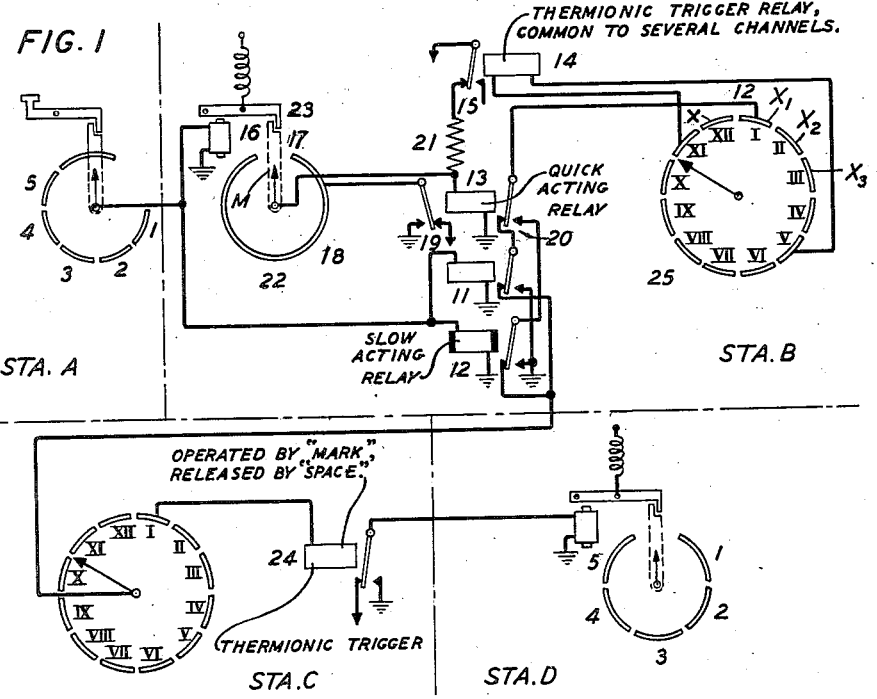

INVENTORS: C. R. DUNHAM
A. H. ROCHE
BY J. W. Schmied
ATTORNEY

March 21, 1933.    C. R. DUNHAM ET AL    1,901,951
MULTIPLEX TELEGRAPH DISTRIBUTOR
Filed Oct. 31, 1931    3 Sheets-Sheet 3

INVENTORS: C. R. DUNHAM
A. H. ROCHE
BY
J. W. Schmied
ATTORNEY

Patented Mar. 21, 1933

1,901,951

UNITED STATES PATENT OFFICE

CARLTON R. DUNHAM AND ALLEMAN H. ROCHE, OF ALDWYCH, LONDON, ENGLAND, ASSIGNORS TO WESTERN ELECTRIC COMPANY, INCORPORATED, OF NEW YORK, N. Y., A CORPORATION OF NEW YORK

MULTIPLEX TELEGRAPH DISTRIBUTOR

Application filed October 31, 1931, Serial No. 572,244, and in Great Britain April 1, 1931.

This invention relates to distributors and systems by or in which a signal channel may be distributed in turn to a plurality of signal transmitting or receiving devices.

The main object of the invention is to provide such a distributor or system which whilst being not so expensive as systems usually adapted to perform similar functions, has many advantages.

In previous distributors or distributor systems it has been usual to employ mechanically moving parts or to use mechanically static devices such as thermionic valves. The present invention is applicable to either of such systems but is particularly useful in connection with valve distributors.

According to one feature of the invention a distributor is adapted for continuous operation and co-operates in unison with a telegraph typewriter transmitter in such manner that the sending of signal units from the transmitter can be effected irrespective of position of the distributor in its cycle and thence transmitted to a line. The telegraph typewriter transmitters and printers are referred to herein as teletypes or teleprinters.

According to another feature the distributor arrangement is such that transmission of a signal unit to a segment of the distributor is adapted to be automatically delayed if it would otherwise have arrived when the distributor was scanning that segment. By segment is here meant the ordinary segment of a mechanical distributor or its analogy in the valve distributor as will be made apparent hereinafter. The system would generally be arranged to give such automatic delaying when the distributor was within certain predetermined limits of scanning that said segment.

According to another feature of the invention, an apparatus such as a teleprinter is associated over a control device with a distributor and said control device is governed conjointly by the signal units, or impulses derived therefrom and by an impulse or impulses derived from the distributor.

According to another feature of the invention, a system for transmission of signal units, as in telegraphy or the like, employs a distributor with segments each individual to a signal unit and is adapted for simultaneous use as a transmitting and receiving distributor.

According to another feature of the invention, a distributor is adapted to condition one by one a plurality of sending channels with a transmission medium and simultaneously to condition one by one in synchronism a plurality of signal receiving devices. The said devices are preferably trigger circuits employing valves.

Means are provided for synchronization over the system and this and other features of the invention will be more fully disclosed in the following description having reference to the accompanying drawings, in which:

Fig. 1 illustrates schematically a complete system according to the present invention.

Fig. 2 is a set of curves used to illustrate the operation of certain of the devices of Fig. 1.

Figure 3:
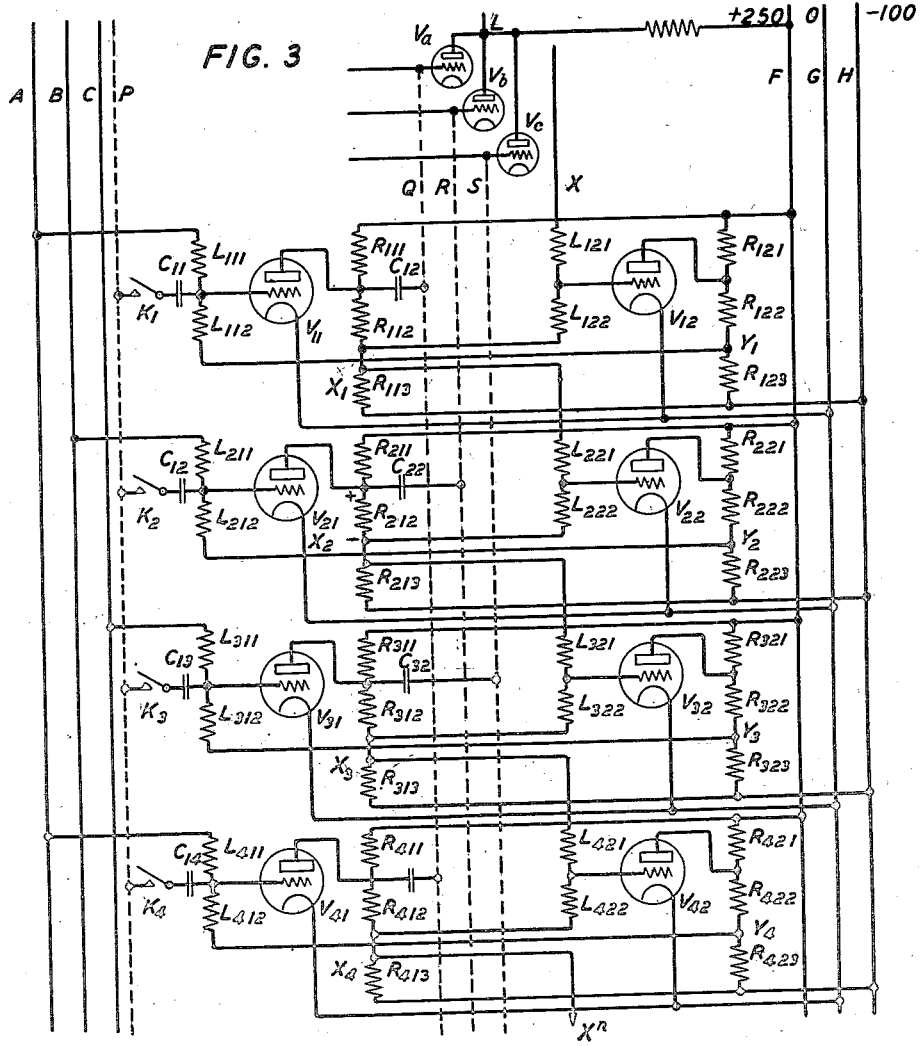
Fig. 3 illustrates a valve distributor which may be used in carrying out the present invention.

Fig. 1 shows a method of using high speed distributors for the purpose of providing several teletype or start stop telegraph channels over a single circuit. B in the figure is the transmitting distributor station, to which run local lines from the several transmitting instruments typified by A. C is the receiving distributor station connected to B by a single circuit and from C run local lines to the several corresponding receiving instruments typified by D. We will consider the instruments at A and D to be teletypes of one of the standard patterns, though no alterations are necessary in the rest of the circuit if these instruments are start stop telegraph transmitter and receiver respectively.

In the figure the distributors have been represented as of the mechanical type in which a rotatable arm on a high speed distributor 25 moves over a plurality of segments $X_1, X_2, X_3 \ldots \ldots X_{12}$, but it is to be understood that the distributors are only shown thus for ease of explanation and generally valve distributors will be used, of the type described hereinafter.

The description of the figure is best made by reference to its operation which is as follows:

Upon depression of a letter key of the teletype at station A, five letter impulses preceded by a "start" spacing impulse and followed by a "stop" marking impulse are sent along the line. At station B these impulses are repeated by the relay 11, or the relay 12, according to the position of relay 13 (whose purpose will be described later) and are fed to one segment $X_1$ of the high speed distributor as shown. Segment $X_2$ of the distributor is fed with impulses from a different teletype by a similar means, and so on for all the segments of the distributor. The high speed distributors perform one revolution in the time of unit impulse from the teletype, so that each segment is connected to the line for a short interval once during each impulse that is applied to it from the corresponding teletype. Thus the character of each impulse (whether marking or spacing) is transmitted down the line to the receiving distributor, and thence to a thermionic trigger relay 24 which is operated or not according as the impulse was a mark or a space. This trigger relay repeats impulses similar to those given to segment $X_1$ at station B, along the local line to the receiving teletype D. The receiving teletype D receives impulses exactly similar to those given out by the transmitting teletype A and thus the two teletypes will work together as though they were directly connected. Each segment in the high speed distributors can thus form a separate teletype channel.

Assuming the signaling speed of a teletype to be 25 cycles, the length of the unit impulses given by a teletype is 1/50 second, so that the high speed distributors must perform 50 revolutions per second. It is clear that the usual requirements and latitude for the speeds of the transmitting and receiving teletypes are sufficient.

In order to ensure satisfactory working of the system, it is necessary that during the interval in which any one segment of the high speed transmitting distributor is open the impulses fed to it from the corresponding teletype do not change from a mark to space or vice versa. That is, the beginning and end of each impulse must occur during the period in which the corresponding segment is not open. As the instants at which the impulses given from a teletype begin and end depend only on the exact instant at which the letter key is depressed, (over which there is no control), it is proposed to obtain the necessary condition of unison between teletype and high speed distributor by means of the following artifice.

11 and 12 are repeating relays, and receive the impulses from the teletype in parallel. 12 is slugged so that it makes and breaks 1/100 second approximately after 11. The impulses as repeated by one or other (but not necessarily both) of these relays will satisfy the necessary condition for the duration of one letter. Upon the receipt of the start impulse preceding each letter, the rotating device 22 causes the relay 13 to select the output from relay 11 or from 12 (which ever is required for unison) and connect it to the high speed distributor segment.

The rotating device 22 consists of an arm 17, held by a catch 23 under the influence of a magnet 16 connected to the line from the distant teletype. Upon the receipt of the start impulse (a space) preceding any given letter, magnet 16 de-energizes, and the arm 17 is released, and is rotated by a mechanism not shown, at a speed equal to that of a teletype receiving shaft. It completes one revolution whilst the five letter impulses are being received and is held again by arm 23 during the "stop" impulse in readiness for a similar operation upon receipt of the next "start" impulse.

14 is a thermionic trigger relay (which may be common to a small number of adjacent channels), this relay is operated in one direction by an impulse from a certain segment of the distributor and restored by an impulse from a later segment. Thus the armature of the relay is made to vibrate to and fro once per revolution of the distributor. Relay 13 vibrates in synchronism with this by a circuit through the contacts 15 of the thermionic relay and resistance 21. Upon receipt of a start impulse however, the rotating arm M makes contact with the arc 18 and the relay 13 is locked in whichever position it is in (or is next in, if at that moment in motion) and remains so during the five selecting impulses following the start pulse, for relay 13 does not start vibrating again until the arm 17 is in normal again, that is, until after the selecting impulses have been received and sent on. Relay 13 thus chooses one of the relays 11 and 12 to repeat impulses to the distributor, which one of the two being chosen depends upon the exact instant at which the start impulse is received (determined by the rotating device 22) compared to the position of the open segment in the high speed distributor (as determined by the valve relay 14). Thus by suitably choosing points in the distributor for the operating connections to the valve relay 14, we may ensure that the right relay 11 or 12 is always chosen to repeat the signals. When no letters are being transmitted it is clear that the "stop" signal is always being passed to the distributor, alternately by relays 11 and 12. The momentary break in this signal as relay 13 vibrates from one position to the other will not matter as the corresponding segment in the distributor will not at those instants be open.

The operation of the rotating device and the three relays 11, 12 and 13 is represented in Fig. 2 which refers to the case of twelve channels. In this figure the scale at the top represents milliseconds and P refers to the particular segment of the high speed distributor; in the shaded portions of P the segment under consideration is closed and in the unshaded portions it is open, and may then transmit a signal to the distant station. In Q the spaces marked 11 are, when relay 11 is connected to the segment, those marked 12 are when relay 12 is connected to the segment and the shaded portions are when relay 13 is in motion and can connect either 11 or 12 to the segment. R shows the beginning of a typical set of impulses as received from the transmitting teletype, EF is the start pulse and FG the first of the five selecting pulses. S shows this set as repeated by relay 11 after the delay EH, and T shows the set as repeated by relay 12 after the further delay HL which should be about 10 milliseconds. A short time after the receipt of the beginning of the start pulse the rotating device 22 provides the locking current to relay 13. This is shown in R as the point X. It is necessary that X be between E and H. If X happens between D and B then relay 13 is locked so that relay 12 is connected to the distributor, and the impulses T are fed to the segment and if X happens between B and D the relay 11 is connected to the distributor and impulses S are fed to the segment. In the first case then the beginning of the start impulse will be applied to the distributor somewhere between two points such as $L_1$ and $L_2$ (in Q) and in the second case between two such points $H_1$ and $H_2$, (where B $H_1$=D $H_2$=D $L_2$=XH). The timing of the relays should be such that $H_1$ $H_2$ and $L_1$ $L_2$ are in the center of the shaded portions of P. In such a case the accuracy required in the relay times must be such that the periods $H_1$ $H_2$ and $L_1$ $L_2$ do not extend as far as the unshaded portions of P. Thus, taking the case of $L_1$ $L_2$ will lag behind its proper position and tend to stray into the unshaded portion if D lags behind its proper position, if EX is shortened, or, if EL is lengthened. We may expect any error in the position of D, that is, in the operation of relay 13, which is a quick acting relay controlled by the relay 14, also quick acting, to be less than 1 millisecond.

The time EX is of the order of 2 milliseconds, hence the error in this time EX should be certainly less than 1 millisecond. The time EL, which is the lag of relay 12 is about 15 milliseconds. which allowing a 10% variation may have an error of 1.5 milliseconds. So, in the worst case, $L_2$ may lag behind its proper position by 3.5 milliseconds, which will not cause it to stray into the unshaded portion of P (an error of 4.1 milliseconds would be required to do so). Similarly it can be shown that errors of the same magnitude, will not cause $H_1$, $H_2$ and $L_1$ to stray into the unshaded portions. Hence we may assume that the relays required in the arrangement described above need only meet ordinary requirements of accuracy in times of operation and release.

The arrangement of Fig. 3 shows a valve distributor built up of a plurality of units each consisting of two valves such as $V_{11}$ and $V_{12}$. These units with their associated circuits are similar and therefore the description of one unit with its associated circuits will serve to explain the figure, except for the interaction of one unit upon another which is to be explained later. The unit consisting of valves $V_{21}$ and $V_{22}$ will be considered first. Assume that each valve $V_{21}$ and $V_{22}$ is such that for a grid voltage of $-2$ volts, the valve operates as a normal amplifier taking a plate current of 1 milliampere, and at a grid voltage of $-6$ volts or more, the valve is completely paralyzed and will pass no plate current.

The resistances $R_{211}$, $R_{212}$ and $R_{213}$ form a potentiometer connected across points of a battery F and H, which are at potential $+250$ volts and $-100$ volts with respect to the common filament potential of all valves. Plate current is supplied from the point F to the valve $V_{21}$ via the resistance $R_{211}$.

The values of the resistances $R_{211}$, $R_{212}$ and $R_{213}$ are chosen such that, when the grid voltage of $V_{21}$ is $-6$ volts or more the potential at the junction $X_2$ of $R_{212}$ and $R_{213}$ is $-2$ volts, and that when the grid voltage of $V_{21}$ is $-2$ volts, the potential at the junction $X_2$ of $R_{212}$ and $R_{213}$ is $-10$ volts. This change in voltage is obtained by virtue of the volts lost by passage of the plate current through $R_{211}$. In an exactly similar fashion there is associated with $V_{22}$ a potentiometer of three resistances $R_{221}$, $R_{222}$ and $R_{223}$. Grid leaks $L_{211}$ and $L_{212}$ of equal value connect the grid of $V_{21}$ to the junction $Y_2$ of resistances $R_{222}$ and $R_{223}$, and also to the point B, to which there is applied a square wave which has a voltage with respect to the filament voltage of $-2$ volts for half its cycle and of $-10$ volts for half its cycle. Thus the grid voltage of the valve $_{21}$ is the mean of the potentials at B and $Y_2$, and therefore the valve $V_{21}$ can only operate (as an amplifier) when the potentials at B and at $Y_2$ are both −2 volts. That is the valve $V_{21}$ can only operate when the square wave B is in the positive (less negative) half of its cycle and the valve $V_{22}$ is inoperative. It is to be noted in particular that if the valve $V_{22}$ is operated, the valve $V_{21}$ cannot become operative in any part of the cycle of the controlling wave.

The grid voltage of the valve $V_{22}$ is the mean of the potentials at $X_2$ and of $X_1$ the corresponding point of the previous unit. Hence valve $V_{22}$ is operative only when both $V_{11}$ and $V_{21}$ are inoperative.

In the remaining valve units the controlling waves for the 1st, 4th, 7th, 10th . . . . is taken from points A, for the 2nd, 5th, 8th, 11th, . . . . from point B, and the 3rd, 6th, 9th, 12th, . . . . from point C. The waves A, B and C are similar in form but B is retarded by 120° with regard to A, and C by 120° with regard to B. The other groups are composed of similar parts to these described and in order to show this in the drawings the same reference letters are used throughout the group identification being given by the first numeral appearing after the reference letter.

Considering the operation of the system as a whole it is seen that if the point X is given a potential −2 volts, a stable condition is with the left hand valve in each unit inoperative, and the right hand valve operative; the points $X_1, X_2, X_3$ . . . . have potential −2 volts, the points $Y_1, Y_2, Y_3$ . . . . . . −10 volts. This will be called the normal condition for each unit and for the system as a whole. If there be now applied to the point $X_1$ an impulse of potential −10 volts, the valve $V_{12}$ is made inoperative and the point $Y_1$ becomes of potential −2 volts. When the point A has potential −2 volts (which it does in the positive (less negative) half of its cycle), the valve $V_{11}$ becomes operative and the point $X_1$ now has potential −10 volts. This locks the valve $V_{12}$ in an unoperated condition and passes a working impulse to the valve $V_{22}$ in the next unit. This action continues until the square wave applied to B gets in its positive (less negative) half cycle when the valve $V_{21}$ becomes operative. At a subsequent instant, the square wave applied to A falls to its negative half cycle, the valve $V_{11}$ becomes inoperative and the valve $V_{12}$ operative (we have assumed that the impulse applied to $X_1$ has by this time been removed). Thus the unit comprising $V_{11}$ and $V_{12}$ is restored to normal condition and it remains so, until a further impulse is applied to $X_1$. The impulse that this unit has applied to the valve $V_{22}$, makes the second unit operative during the positive (less negative) half of the cycle of the wave B passing a further impulse to the valve $V_{32}$ in the third unit.

The train of operations continues, all the valve units in the system become operative in turn until the last unit is reached. If the point $X_n$ in the last unit is joined to the point $X_1$ a cyclic arrangement of units is produced (there being a multiple of three units), and the train of operations continues round the circle endlessly.

How the above may be used as the transmitting distributor of a telegraph system will now be described. $K_1, K_2, K_3$ . . . indicate contacts of the several transmitters that are required to be connected to the line in turn. Consider the circuit through the contact $K_1$. During that part of the cycle in which the valve $V_{11}$ is operative, high frequency current passes (or fails to pass, according to the position of the contact $K_1$) from a source P, via the small condenser $C_{11}$ valve $V_{11}$, small condenser $C_{12}$ to the valve $V_a$ and thence to the line. Similarly when the second unit is in operation, high frequency current passes or does not pass by the contact $K_2$, via the valve $V_a$ to the line. The valve $V_b$ is interposed in the 1st, 4th, 7th . . . circuits, $V_b$ in the 2nd, 5th, 8th, . . . circuits $V_c$ in the 3rd, 6th, 9th . . . . the function of the valves being to correct the length of the signal impulses applied to the line. This is necessary owing to the fact that impulses supplied from the distributor proper would otherwise overlap each other, and is accomplished by applying to the grids of the valves $V_a, V_b$ and $V_c$, three square waves A, B and C, each of which has the relatively positive portion of its cycle half as long as the negative. Thus the valves $V_a, V_b$ and $V_c$ are each paralyzed through two-thirds of each cycle, and function through one-third of each cycle in turn as normal amplifiers passing the signals to line so that they do not overlap. This operation is illustrated in Fig. 2 of the drawings of British Patent 357,532, the complete specification of which was accepted Sept. 14, 1931.

For the purpose of describing the present invention we shall regard the distributor to consist of only 12 segments. This is to say, we shall consider that there are only 12 pairs of valves giving 12 points $X_1, X_2, X_3$ . . . . $X_{12}$ from which impulses may be derived during the sequence of operation in the distributor.

Figure 4:
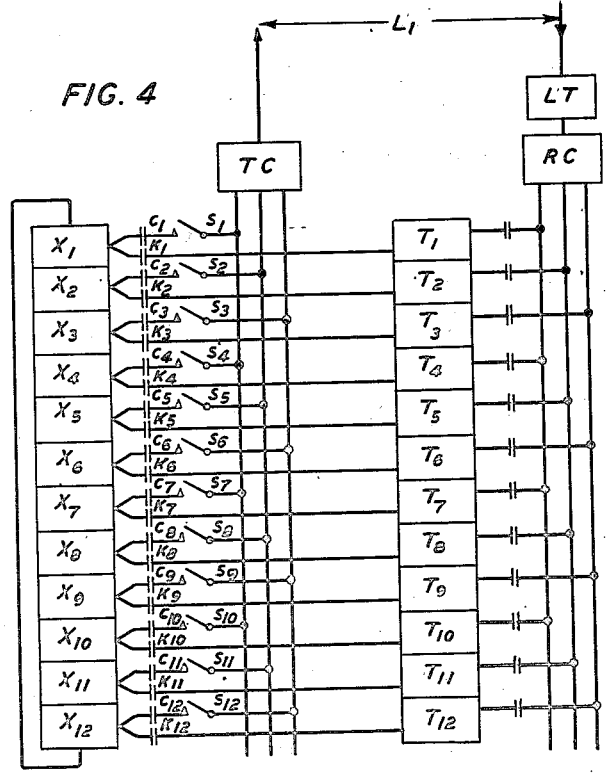
Fig. 4 illustrates the adaptation of the distributor of Fig. 3 to a system designed on the principles of the present invention.

In Fig. 4 the rectangles $X_1, X_2, X_3$ . . . . $X_{12}$ represent the 12 segments as above defined. Segment $X_1$ is connected to a condenser $C_1$ and over a switch $S_1$ to a transmitting corrector T. C. and to the line $L_1$. T. C. represents the devices $V_a, V_b$ and $V_c$ of Fig. 3. The segment $X_1$ is connected over a condenser $K_1$ to a trigger device $T_1$. This trigger device may be any of the known types, preferably that shown in Fig. 6 which will be hereinafter described. The trigger device $T_1$ is such that it has two conditions of stability from either of which it may be caused to move by the joint impression thereon of a pulse from $X_1$ and a signal pulse received from the line $L_1$ over the apparatus L. T. and R. C. L. T. is also a trigger device of similar character but this is adapted to "flip-flop" merely on the reception of the signal pulse from the line $L_1$. R. C. is a correcting device similar to T. C. to prevent overlapping of the signal elements. The operation for transmission is as follows:

Considering the point $X_1$, a pulse is generated once during every revolution of the distributor and will be transmitted through the condenser $C_1$ and will reach the transmitting corrector T. C. only if the relay contact $S_1$ is closed by the signal set up on the telegraph transmitting apparatus. Therefore, if $S_1$ is closed a pulse of suitable length as determined by the transmitting corrector T. C. will be sent out to the line. If $S_1$ is open no pulse will go out on the line. The operation of the other segments in the distributor is exactly similar and the method of transmission will be clear.

Figure 6:
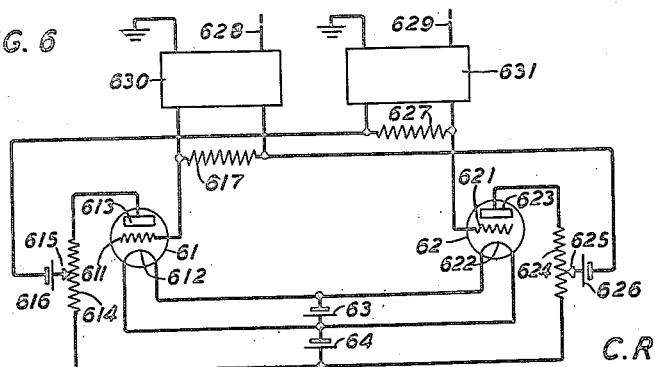
Fig. 6 illustrates a trigger device or relay comprising a pair of thermionic valves arranged to assume either of two stable conditions in response to signal impulses.

Considering the receiving side, trigger devices $T_1$, $T_2$, $T_3$, etc. are associated with each segment of the distributor and are connected to them through the condensers $K_1$, $K_2$ etc. This means that each trigger device will receive a pulse once every revolution of the distributor, but the operating characteristics of the trigger devices are so arranged that this pulse is insufficient to cause them to operate. The received signals coming from the line pass through the receiving trigger device LT to the receiving corrector RC, the three outputs of which are connected to the receiving trigger devices as shown in the diagram. It is now clear that if a signal associated with segment 1 on the distributor is being received from the line a pulse will be applied to the trigger devices $T_1$, $T_4$, $T_7$, $T_{10}$. Owing to the rotation of the distributor however $T_1$ is the only trigger device which is receiving a pulse from the distributor at this moment, and will, therefore, be the only one to operate. The operation of the other segments is precisely similar. In order to avoid unnecessary interconnection of the circuits associated with different segments, it is proposed that the output from the distributor is applied to valve 61 of the trigger device (Fig. 6) while the output from the receiving corrector is applied to valve 62 (Fig. 6). The trigger devices therefore must be so adjusted that they will operate on the combination of the two pulses but not on either one applied separately.

Figure 5:
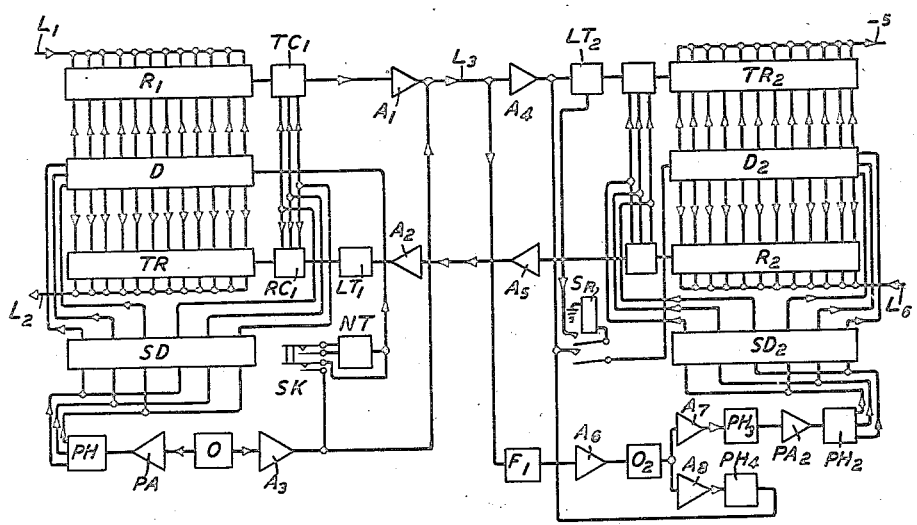
Fig. 5 illustrates schematically but more fully a complete system embodying principles of the present invention.

Fig. 5 illustrates schematically the complete system with synchronization facilities. The line $L_1$ is connected to a transmitting teletype and is associated with a plurality of relays indicated by the rectangle $R_1$. The distributor D is associated with the transmitting relays $R_1$ as has been explained in connection with Fig. 4 and also with the receiving trigger relays TR which in turn are associated with the line $L_2$ connected to a receiving teletype. SD are squaring devices operating on the principle of Fig. 3 and are supplied with three square waves differing in phase which are obtained from the master oscillator O over a power amplifier PA and phase splitting device PH. The transmitting relays $R_1$ are connected to an amplifier $A_1$ over a transmitting corrector $TC_1$ which is similar to TC of Fig. 4. A receiving amplifier $A_2$ is connected over a line trigger device $LT_1$ (similar to LT of Fig. 4) to a receiving corrector $RC_1$, which is associated with the receiving trigger relays TR in the same way as RC was associated with $T_1$, $T_2$ etc. in Fig. 4. NT is a neon tube device or similar arrangement whereby a short pulse may be transmitted to the distributor D and to the line $L_3$ by means of a start key SK. The oscillator O is also connected over an amplifier $A_3$ to the line $L_3$. The controlled station is shown on the right of the figure and this comprises receiving trigger relays $TR_2$, a distributor $D_2$, transmitting relays $R_2$, squaring devices $SD_2$ and other equipment similar to that on the left of the figure and bearing similar reference characters with the different index. The line $L_5$ is connected to the receiving teletypes and line $L_6$ to the transmitting teletypes. The filter $F_1$, oscillator $O_2$, phase shifting devices $PH_2$, $PH_3$ and $PH_4$ and the various amplifiers $A_6$, $A_7$, $A_8$, $PA_2$ are provided for synchronizing purposes and their function is best described by their operation.

Considering the left hand controlling station, the synchronizing frequency is generated by the master oscillator. For the twelve channel case considered this frequency would be 200 cycles, as the square wave frequency required is ⅔ of the signal band in the case where three correcting valves are used. A portion of the output of this oscillator is therefore fed through the power amplifier and phasing device to the squaring devices, while the remainder passes through a separating amplifier $A_3$ and is fed direct on to the outgoing line.

At the controlled station the synchronizing frequency divides, a portion going through the receiving amplifier $A_4$ to the line trigger device $LT_2$ and a portion going to the sharply tuned filter $F_1$ which is designed to pass 200 p. p. s. The output from this filter passes through amplifier $A_6$ and then controls the frequency of the controlled oscillator $O_2$. The output from this oscillator then passes through phase correcting device $PH_3$ and amplifier $PA_2$ after which it is used as a source of square waves. In order to balance out the synchronizing frequency from the line trigger device $LT_2$, a portion of the output from the controlled oscillator is tapped off and fed through amplifier $A_8$ and a phase shifting device $PH_4$ to the input of the line trigger device LT₂. By suitable adjustment of the phase shifter and the gain of the amplifier the synchronizing frequency may be balanced out so as to have no effect on the line trigger device.

It is obvious that in operation the two valve distributors must not only be opening up at the same rate but also that corresponding segments on each distributor must be open at the same moment. This is insured by the starting arrangements shown. The procedure for starting is then as follows:

The synchronizing waves are first switched on so that the square waves supplied to the distributors at each end are in the correct phase relations. The starting key SK at the controlling station is then depressed which causes the neon tube device to flash, thus starting up the distributor at that station. It also sends a pulse to the line which starts up the controlled station distributor, through the contact of the start relay SR which is operated manually before the pulse is sent out from the controlling station. As soon as the pulse is received at the controlled station the line trigger device operates, allowing the start relay SR to fall off. Having once fallen off it cannot operate again from the line trigger device as the operating circuit is through a contact of the relay itself which is now broken.

When it is required to modulate the line signals to higher frequencies before transmission over the line the following method may be used.

The output of the transmitting corrector T. C. of Fig. 4 is applied to the grid of an amplifying valve, in such a manner that this valve becomes paralyzed or not according as T. C. is giving a space or mark impulse. A subsidiary oscillator of the desired carrier frequency also controls the grid of this valve, so that its output consists of impulses of the carrier frequency the duration of which impulses are determined by the D. C. impulses of T. C. This output is delivered to the line (after further amplification, if necessary). At the receiving end the A. C. signals may, after suitable amplification be applied to the line trigger device L. T. which may be adjusted to operate in accordance with the telegraph signals contained in the A. C. signals. Alternatively by the inclusion of a rectifying valve in the line amplifier at the receiving end, the A. C. signals may be restored to D. C. before application to the trigger device L. T. It will be seen from the above that the only apparatus involving additional expense is the oscillator required to provide the necessary carrier frequency. The case considered above, of course, considers the transmission of both side bands. The apparatus required to obtain single side band transmission could be used but would be very much more expensive.

Fig. 6 shows a circuit arrangement, referred to herein as a trigger device, comprising two thermionic valves and it will be seen that the connections are symmetrical. The valves 61 and 62 have resistances 614 and 624 in their respective plate circuits 613, 614, 64, 612 and 623, 624, 64, 622. The grid circuit of valve 61 comprises grid 611, resistance 617, voltage source 626, part of resistance 624, extending from contact 625 to source 64 and thence to cathode 612. Valve 62 has a similar grid circuit symmetrical with respect to that of valve 61 and extending from grid 621 through resistance 627, source 616, contact 615, part of resistance 614 and source 604 to cathode 622.

Consider now that initially there is a relatively large plate current flowing through resistance 614 and a relatively small current through resistance 624. Assume that sources 616 and 626 were initially adjusted so that in the absence of plate current to either valve the potentials of the grids would be equal to the value required to make the valves operate as normal amplifiers. In this condition with plate current through resistance 614, grid 621 is made negative with regard to its normal operating condition as an amplifier by an amount equal to the voltage drop at that part of resistance 614, included between 615 and 64. If this drop in potential of grid 621 is sufficient to effectively prevent any plate current flowing through resistance 624, then grid 611 is biased in its normal condition as an amplifier and a stable condition results. The system will remain in this condition until something happens to disturb it. Imagine now that a current flows through resistance 613 of such magnitude and in such direction as to momentarily bias grid 611 to such a value that the plate current in resistance 614 falls effectively to zero. The immediate result is that grid 621 assumes its normal bias, plate current flows through resistance 624 so that tapping 625 and consequently grid 611 are decreased in potential by the fall in volts along resistance 624, between battery 64 and tapping point 625. In this way valve 61 is held in a stable condition with no plate current and valve 62 in a stable condition with normal plate current, the exact reverse of the stable condition obtained before the impulse was applied to grid 611. Application of a voltage to resistance 627 such as to make grid 621 sufficiently negative over a short period of time and set up the first condition again. It is evident that the amount of negative bias applied to each grid by plate current flowing through the other valve, depends on the position of the tappings and therefore the position of the tappings controls the magnitude of the received signals which must arrive before the opposite condition can be set up. This device can therefore be used as a discriminating arrangement between wanted signals and unwanted signals of only slightly lower value.

Fig. 6 shows one way in which signals simultaneously received from the condenser K over line 628 and from the receiving corrector RC (the condenser and corrector being shown in Fig. 4) could be supplied to the trigger device for purposes of correction. These signals are then sent into straight amplifying devices represented diagrammatically by blocks 630 and 631 which consist of thermionic valve amplifiers, the main object of which is to prevent any interaction between the voltages and resistances 617 and 627. The output of amplifier 630 is connected directly to resistance 617 and the output of amplifier 631 is connected to resistance 627 in such a way that any signal received from the line 628 makes grids 611 and 621 change potential in opposite directions. It is now evident that if positive signals arriving from the line 629 cause plate current to flow in resistance 624, negative signals will cause no plate current to flow in resistance 624. The potential difference across the end of resistance 624 (or alternatively across the end of resistance 614) may then be applied to any suitable form of receiving apparatus.

Although valves of the three electrode type are illustrated it will be apparent to use valves having more than three electrodes, as for example tetrode and pentode varieties.

It will be understood that various modifications may be made in the above described embodiments without exceeding the scope of the invention.

What is claimed is:

1. In a signal transmission system, transmitting devices, a distributor adapted for continuous operation and cooperating in unison with said transmitting devices, a line for receiving signals from said distributor, a plurality of means for transmitting a signal unit or impulse from one of said transmitters to said line at either of two different moments during each revolution of said distributor whereby the sending of the signals from the transmitters through the distributor to the line can be effected irrespective of the position of the distributor in its cycle.

2. In a signal transmission system, according to claim 1, wherein said means comprises a relatively slow acting device operating in conjunction with a second device for automatically delaying the transmission of the impulse if the impulse would otherwise have arrived when the distributor was positioned at the time within predetermined limits of a section thereof designed to receive the impulse.

3. In a signal transmission system, according to claim 1, wherein the distributor is of the thermionic valve type comprising a plurality of units respectively arranged to operate over a plurality of start-stop telegraph transmission channels, said valve distributor being arranged to operate through one complete cycle in the time taken for a unit impulse from the transmitter.

4. In a signal transmission system, according to claim 1, wherein said means is a control device arranged to be governed jointly by a signal unit or impulse derived therefrom and by an impulse derived from said distributor.

5. In a signal transmission system, according to claim 1, wherein the distributor has sections or unit parts each adapted for simultaneous transmission and receiving.

6. In a signal transmission system, according to claim 1, wherein said distributor has sections or unit parts which are common to a system arranged to transmit and receive simultaneously.

7. In a signal transmission system, according to claim 1, wherein the distributor is adapted to position one by one a plurality of sending channels with the transmitters and simultaneously to position one by one in synchronism a plurality of signal receiving devices.

8. In a signal transmission system, according to claim 1, wherein the receiving devices are respectively associated with said transmitting devices, said receiving devices being trigger circuits comprising thermionic valves.

9. A synchronizing system for telegraphy, comprising a first and second station, means for transmitting a synchronizing current from said first station to said second station, synchronizing mechanism at said second station, a current selective device at said second station for operating said synchronizing mechanism, circuit means for shunting at the input of said second station a portion of said current about said current selective device, phase changing devices and amplifiers for receiving said shunted current and other circuit means whereby the current derived from said shunted current after appropriate modification in phase and/or magnitude, is fed to said input to balance the effect of any synchronizing current which has traversed said current selective device.

10. A signal transmission system comprising a valve distributor, teletype transmitters, a line connected to each of said transmitters, a plurality of valve circuits so arranged that successive impulses on said line may be respectively transmitted to the various valve circuits, a main line for receiving impulses from said valve circuits, a plurality of trigger devices associated with said main line, through which said impulses are respectively passed in sequence, each of said devices being responsive only to the joint impression thereon of an impulse received from the distributor and one received from said main line.

11. In a signal transmission system, according to claim 1, wherein a switching device under the control of a transmitting device, is adapted to operate from a start impulse and to remain operated until some period during the last or stop impulse of a signal combination, and a control device controlled by said switching device for determining the transmission time of a signal unit or impulse from the transmitting device to the distributor.

12. In a signal transmission system, according to claim 1 wherein a start-stop distributor under the control of a transmitting device, is adapted to operate from a start impulse and to remain operated until some period during the stop impulse of a signal combination and a control device controlled by said switching device for determining the transmission time of a signal unit or impulse from the transmitting device to the distributor.

13. In a signal transmission system, according to claim 1, wherein the said means comprises two relay devices having a difference in time of operation equal to a half period of revolution of said distributor.

14. In a signal transmission system, according to claim 1, wherein a switching device is arranged to associate each transmitting device with a section or segment of said distributor over either of said means for transmitting a signal unit or impulse at different moments, one of said means being relatively slow acting in operation and a control device controlled by said switching device for determining the operating effect of either of said means.

15. In a signal transmission system according to claim 1, wherein a switching device is arranged to associate each transmitting device with a section or segment of said distributor over either of said means for transmitting a signal unit or impulse at different moments, a "flip-flop" relay device actuated from said distributor, and a control device the energization of which depends on the position of said switching device and also upon said "flip-flop" device.

16. In a signal system according to claim 1 wherein an oscillator is provided with its output under the control of the signal impulses from said distributor.

17. In a signal system according to claim 10 wherein a high frequency source is connected to said main line and means for applying the high frequency signals received from said main line direct to said trigger devices.

In witness whereof, we hereunto subscribe our names this 7th day of October 1931.

CARLTON R. DUNHAM.
ALLEMAN H. ROCHE.